US006664675B2

(12) United States Patent
Kaizu

(10) Patent No.: US 6,664,675 B2
(45) Date of Patent: Dec. 16, 2003

(54) VEHICLE ROTARY ELECTRIC MACHINE WITH A RECTIFIER PROTECTION ARRANGEMENT HAVING A SACRIFICIAL MEMBER

(75) Inventor: Hiroo Kaizu, Nishio (JP)

(73) Assignee: Denso Corporation, Kariya (JP)

( * ) Notice: Subject to any disclaimer, the term of this patent is extended or adjusted under 35 U.S.C. 154(b) by 60 days.

(21) Appl. No.: 09/924,595

(22) Filed: Aug. 9, 2001

(65) Prior Publication Data
US 2002/0047360 A1 Apr. 25, 2002

(30) Foreign Application Priority Data
Aug. 9, 2000 (JP) .......................................... 2000-241152

(51) Int. Cl.[7] .................. H02K 19/36; H02K 19/22; H02K 5/22
(52) U.S. Cl. .................. 310/68 D; 310/71; 363/141
(58) Field of Search .................. 310/68 D, 71, 310/68 R; 363/141, 145

(56) References Cited

U.S. PATENT DOCUMENTS

| 4,093,529 A | 6/1978 | Strobach ..................... 204/196 |
| 4,694,211 A | 9/1987 | Bayha et al. ................ 204/196 |
| 5,043,836 A | * 8/1991 | Fukushima .................. 361/301 |
| 5,710,467 A | * 1/1998 | Irie et al. ...................... 310/64 |
| 5,977,669 A | * 11/1999 | Yoshida et al. ............ 310/68 D |
| 6,034,452 A | * 3/2000 | Nakamura et al. ........ 310/68 D |
| 6,150,741 A | * 11/2000 | Hayashi et al. ............ 310/68 D |

FOREIGN PATENT DOCUMENTS

| EP | 0 920 111 B1 | 6/1999 | ............ H02K/11/04 |
| JP | Y2-7-24932 | 7/1990 | ............ H02K/19/36 |
| JP | 3-32340 | 2/1991 | ............ H02K/13/00 |
| JP | A-6-133509 | 6/1994 | ............ H02K/19/36 |
| JP | 2002-125347 | * 4/2002 | ............ H02K/5/22 |
| JP | 2002-136076 | * 5/2002 | ............ H02K/19/36 |

* cited by examiner

Primary Examiner—Karl Tamai
(74) Attorney, Agent, or Firm—Oliff & Berridge, PLC

(57) ABSTRACT

A rectifier protection arrangement of a vehicle rotary electric machine is disposed where conductive liquid may be splashed on thereon. The arrangement includes a positive conductor member that is connected to a positive terminal of a battery and has a higher normal electrode potential than hydrogen and an insulation member disposed in contact with a ground potential conductor member to insulate the positive conductor member, a sacrificing metal member that has a lower normal electrode potential than the positive potential conductor member is disposed between the positive conductor member and the insulation member. The sacrificing metal member has a higher electric resistance than the positive potential conductor member if oxidized.

6 Claims, 5 Drawing Sheets

VEHICLE ROTARY ELECTRIC MACHINE WITH A RECTIFIER PROTECTION ARRANGEMENT HAVING A SACRIFICIAL MEMBER

CROSS REFERENCE TO RELATED APPLICATION

The present application is based on and claims priority from Japanese Patent Application 2000-241152 filed Aug. 9, 2000, the contents of which are incorporated herein by reference.

BACKGROUND OF THE INVENTION

1. Field of the Invention

The present invention relates to a rectifier protection arrangement a vehicle rotary electric machine.

2. Description of the Related Art

A common rectifier unit is accommodated between a frame 100 and a metal cover 101 of a vehicle AC generator, as shown in FIG. 5. The rectifier unit is comprised of a bridge circuit of four positive rectifier elements 108 and four negative rectifier elements (not shown) and a terminal unit 104. The positive rectifier elements 108 are fixed to a positive fin 105 by soldering or press-fitting, and the negative rectifier elements (not shown) are also fixed to a negative fin 107 in the same manner as above. A metal terminal 110 is molded together with the terminal unit 104. An end of the metal terminal 110 is connected to a lead 109, and the other end is connected to a terminal of one of the rectifier elements 108. The molding material of the terminal unit 104 is thermoplastic resin such as polyphenylene sulfide, which is excellent in moldability, dimensional stability, heat resistance, and electric insulation. An insulation bush 106 is interposed between the positive fin 105 and negative fin 107 and does not require molding with a metal member such as the terminal unit 4. The insulation bush 106 is a simple cylindrical member made of an inexpensive thermosetting resin such as a phenol resin for providing a space between the two fins 105 and 107. In assembling, a bolt 102 is press-fitted into the frame 100 at first. Then, the rectifier unit is mounted on the frame so that the pile rivet is fitted to the bolt 102. Thereafter, a mounting hole of the cover is fitted to the bolt, so that the rectifier unit and the cover are fastened to the frame 100 by a nut 111. Thus, the positive fin 105 is fixed to be spaced apart from the negative fin 107, the frame 100, the bolt 102 and the cover 101.

In the vehicle AC generator with a rectifier unit included, conductive liquid such as salt water may get in through air intake windows or air discharge windows, thereby causing electric discharge along a surface of the insulation member disposed between the positive fin 105 and the negative fin 107, the frame 100, the bolt 102 or the cover 101. Copper ions are dissolved into the conductive liquid from the positive fin 105, which is usually made of copper in order to provide good heat radiation. Because the copper ions have a higher normal electrode potential than hydrogen ion, copper ions are attracted to a surface of a negative potential and the copper ions deposit on the surface, and oxidized copper deposit on the surface of the insulation member after the conductive liquid dries out. As a result, electric resistance of the surface decreases, and more leak current flows along the surface.

In order to prevent the above problem, a rectifier unit has various components covered by resinous insulation films at the surfaces of metal members thereof.

It is impossible to cover the positive fin and the negative fin with insulation resin after the terminal unit, the positive fin, the bush, and the negative fin are piled and fastened together by the bolt and the nut. Otherwise, temperature of the rectifier elements of the rectifier unit when operating under high ambient temperature with high output current becomes so high that creep or strain may be caused due to decrease in the viscosity and the elasticity of the insulation film. As a result, the nut is unfastened and the rectifier may be damaged by vibration.

SUMMARY OF THE INVENTION

The present invention has been made to provide a vehicle AC generator that can solve the above problem by preventing the creep of the insulation cover and the electric discharge along the surface of the positive conductor members thereof.

In order to attain the above object, a rotary electric machine has a rectifier protection arrangement disposed where conductive liquid, such as salt water, may be splashed on the surface thereof. The vehicle rotary electric machine according to a main aspect of the invention, the rectifier protection arrangement includes a positive conductor member that has a higher normal electrode potential than hydrogen, and an insulation member that insulates the positive conductor member. A sacrificing metal member that has a lower normal electrode potential than the surface of the positive potential conductor member is disposed between the positive potential conductor member and the insulation member. The sacrificing metal member has a higher electric resistance than the positive potential conductor member if oxidized.

Even if the surface of the insulation member gets wet with conductive liquid and surface discharging takes place between the positive potential conductor member biased by a vehicle battery to be at a high potential and the ground potential conductor member, the sacrificing metal member of a higher ionization tendency is more soluble into the conductive liquid so that the ions of the positive conductor member (e.g. copper) can be prevented from being dissolved into the conductive liquid, because the sacrificing metal member, which is in contact with the positive potential conductor member, has the same potential as the latter. The total amount of the positive ions in the conductor liquid is the same as the total amount of the negative ions in the conductor liquid. Therefore, the ions of the sacrificing metal member are dissolved into the conductive liquid in place of hydrogen ions, and the ions of the positive potential conductor member of a lower ionization tendency are prevented from being dissolved.

As a result, surface-discharging passage formed due to deposit of metal atoms on the surface of the insulation member is suppressed. In other words, the resistance of the surface-discharging passage increases and leak current can be prevented.

When the sacrificing metal member is oxidized, it will have a high resistance. Even if the ions of the sacrificing metal member that have been dissolved in the conductive liquid are deposited on the surface of the ground potential member or the insulation member, the deposited metal is oxidized to have a high electric resistance. This prevents decrease in electric resistance of the surface-discharging passage due to the deposit of the sacrificing metal.

The sacrificing metal member may be formed from one of the following metals: iron, aluminum, nickel, tin, chrome, etc. In particular, iron is good for restricting the surface discharge because it will have a high electric resistance when oxidized.

In the rectifier protection arrangement of the vehicle AC generator according to an additional aspect of the invention, if the sacrificing metal member gets wet with salt water or conductive liquid even after the oxidized layer of the sacrificing metal is formed on the sacrificing metal member, metal ions thereof are soluble in the conductive liquid through the oxidized layer.

If a oxidized layer that is formed on the sacrificing metal member gets wet with conductive liquid, the metal ions of the sacrificing metal member are continuously dissolved into the conductive liquid. Therefore, the ions of the positive potential conductor member are prevented from being dissolved so that the resistance of the surface-discharging passage can prevented from lowering.

If the oxidized layer having high resistance formed on the surface of the sacrificing metal member is not so dense, the inside of the sacrificing metal, with or without conductive liquid, may be continuously oxidized. However, the fastening force will not lower because the volume of the sacrificing member is increased by the oxidization.

In the rectifier protection arrangement according to an additional feature of the invention, the sacrificing metal member covers portions other than electric connection surface of the positive potential conductor member.

Even if the oxidized layer of the sacrificing metal member has a high electric resistance, any portion of the oxidized layer of the sacrificing metal member may not stick to the contact surface (the surface in contact with lead wires) of the positive potential conductor member. Therefore, any voltage drop due to increase in contact resistance can be prevented. It is possible that the layer of the sacrificing metal has a low electric resistance, and the oxidized layer is dense instead of being porous, and the resistance of the oxidized layer is low instead of being high.

In the rectifier protection arrangement according to an additional feature of the invention, the positive potential conductor member comprises a positive fin including positive rectifier elements having an electric terminal mounted thereon, the ground potential conductor member including negative fins mounted thereon, the insulation member comprises a spacer having a hole that maintains a space between the two fins, and the sacrificing metal member includes a ring or flanged member disposed between the spacer and one of the fins.

If the sacrificing metal member is iron, and iron ions are dissolved into the conductive liquid, hydrogen ions in the liquid form hydrogen gas on the side of the negative fin. The iron ions in the liquid will form a deposit of oxidized iron under a high ambient temperature. This oxidized iron, which is non-conductive, does not cause surface discharge.

The sacrificing metal member, which is fixed when other members are fixed, does not make the assembling step complicated.

In a preferred embodiment, the sacrificing metal member has a flange for covering the inner surface of the positive fin and an end surface of the negative fin. Therefore, sacrificing metal member can be brought in contact with and held by the positive fin to equalize the potential of the sacrificing metal member to the positive fin.

In a preferred embodiment, the positive fin is covered by the sacrificing metal member except the electric contact portion. Therefore, the positive fin is prevented from being covered by a non-oxidized metal deposit or a high conductive oxidized metal deposit of metal ions that are dissolved from the surface of the positive fin.

In the rectifier protection arrangement according to an additional feature of the invention, the positive potential conductor member includes an output terminal bolt protruding from a cover of the rectifier unit fixed thereto, the ground potential conductor member includes a cover or a frame of the vehicle AC generator to which the cover is fixed, the insulation member includes a resinous spacer having a hole through which the output terminal bolt extends, the spacer being fixed to the cover, the sacrificing metal member includes a ring or a flange disposed between the spacer and the output terminal bolt, and the sacrificing metal member and the insulation member are fastened to each other when a cable is fastened to the output terminal bolt.

With the above structure, the metal ions of the sacrificing metal member are dissolved and the oxidized deposit forms a high electric resistance. Even if the spacer having a hole (insulation member) disposed between the output terminal bolt and the metal cover or the spacer having a hole (insulation member) disposed between the output terminal bolt and the metal frame gets wet with conductive liquid, the surface of the insulation member is prevented from being covered by a non-oxidized metal deposit or a high conductive oxidized metal deposit of metal ions that are dissolved from the output terminal bolt.

The sacrificing metal member, which is fixed when other members are fixed, does not make the assembling step complicated.

In a preferred embodiment, the sacrificing metal member has a flange for covering the inner surface of the hole through which the output terminal bolt extends and the surroundings thereof. Therefore, sacrificing metal member can be brought in contact with and held by the output terminal bolt to equalize the potential of the sacrificing metal member to the positive fin.

Further, the sacrificing metal member has a projection at the portion in contact with the positive conductor member. The positive conductor member can be surely brought in contact with the sacrificing metal member. The sacrificing member also support the positive conductor member by its spring force when assembled.

In the preferred embodiment, the output terminal is covered by the sacrificing metal member except the electric contact portion. Therefore, the positive fin is prevented from being covered by a non-oxidized metal deposit or a high conductive oxidized metal deposit of metal ions that are dissolved from the surface of the positive fin.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
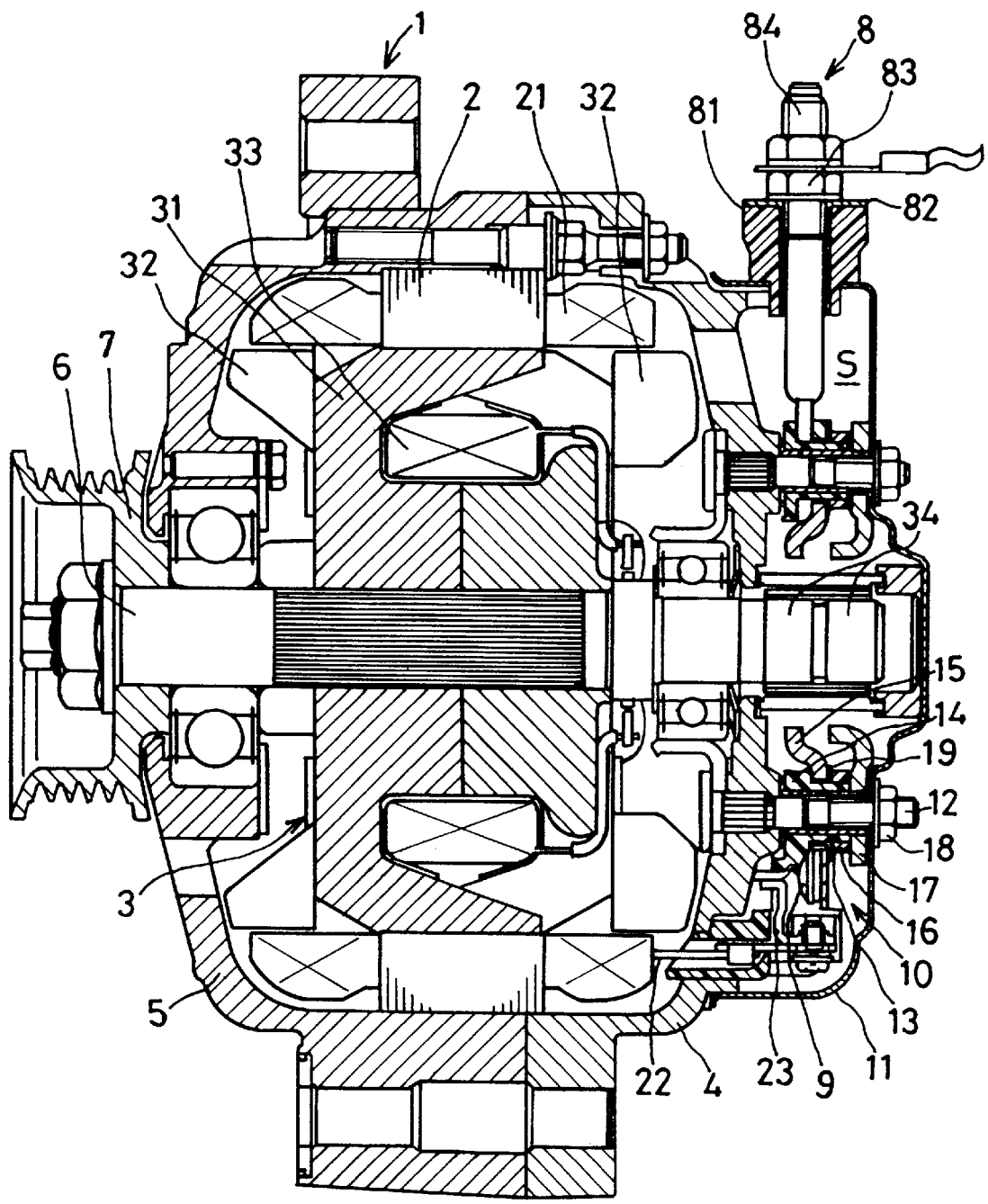
FIG. 1 is an axial cross-sectional view of a main portion of a vehicle AC generator according to a first embodiment.
Figure 2:
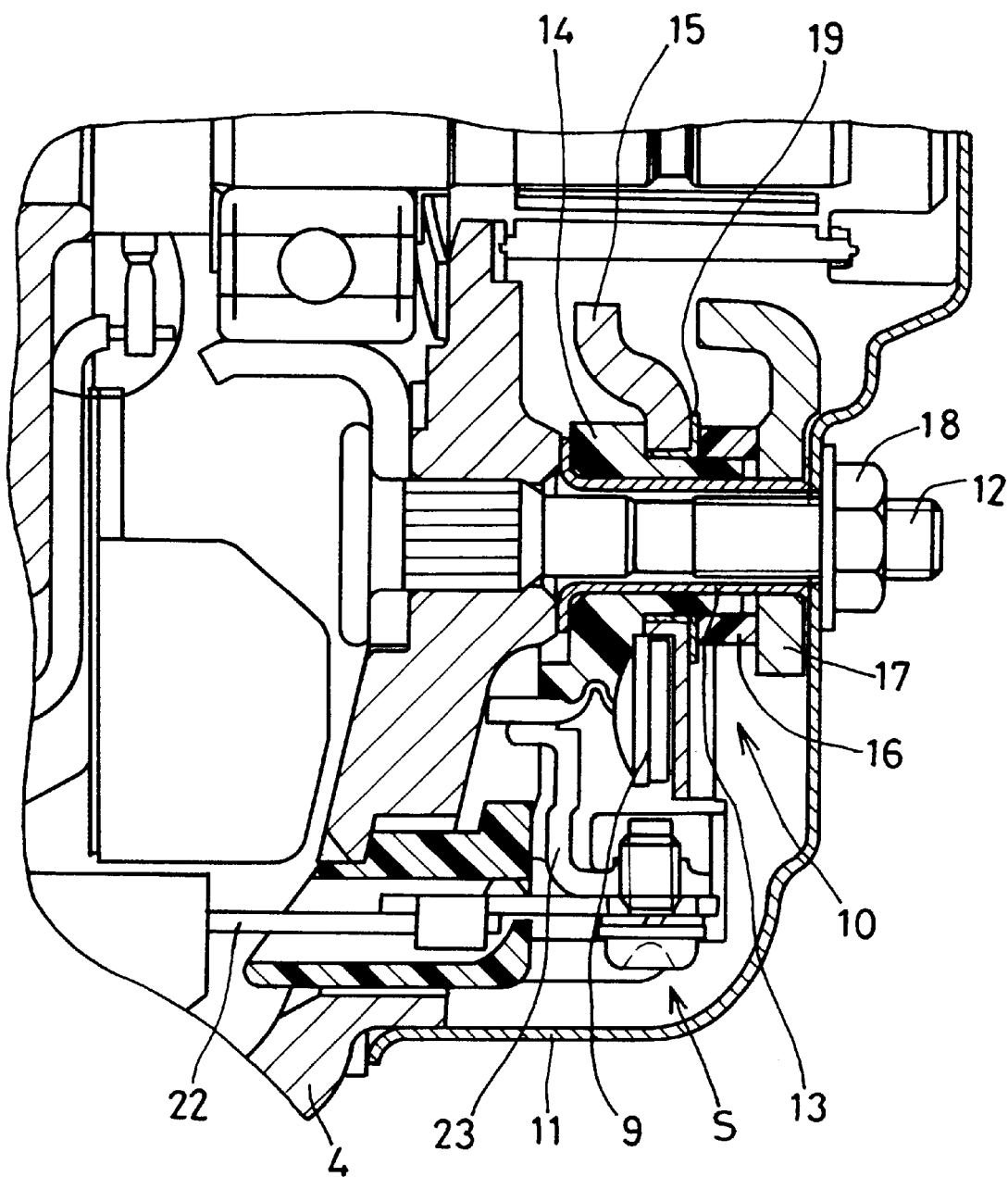
FIG. 2 is an enlarged cross-sectional view of a rectifier protection arrangement of a rectifier unit of the vehicle AC generator shown in FIG. 1.

A rectifier protection arrangement according to a first embodiment of the invention is described with reference to FIGS. 1 and 2.

An vehicle AC generator 1 is comprised of a stator 2 as an armature, a rotor 3 as a magnetic field member, a pair of aluminum-made rear frame 4 and front frame 5 that supports the rotor 3 and the stator 2 and a rectifier 10.

The stator 2 is comprised of an iron-made stator core and a copper-made stator coil 21 from which copper lead wires extend outwardly.

The rotor 3 is comprised of a pair of iron-made pole cores 31 having a plurality of claw poles, a pair of iron-made cooling fans 32, a copper field coil 33, a pair of copper-made slip rings 34, a steel shaft 6, etc. The shaft 6 and the pole cores 31 are spline-connected to each other. The shaft 6 is driven by a vehicle engine (not shown) via a pulley 7. When the field coil 33 is supplied with current through the pair of slip rings 34, AC voltage is induced in the stator coil 21. The AC voltage is conducted by the lead wires 22 to the rectifier 10, which rectifies the full waves of AC power into DC power.

The rectifier 10 is disposed in a component-compartment S formed between the aluminum rear frame 4 and an iron-plate cover 11. In the rectifier unit 10, an iron pipe rivet 13 pierces and, thereafter, fixes a terminal unit 14, a copper-made positive fin (positive potential conductor member) 15, a iron-made insulation bush (sacrificing metal member) 19, an insulation bush (insulation member) 16 and a copper-made negative fin 17 (ground potential conductor member), in this order. The positive rectifier elements 9 are fixed and connected to the positive fin 15, and the negative rectifier elements (not shown) are fixed, by means of soldering or press-fitting, to the negative fin 17. The terminal unit has a plurality of metal terminals 23, which is integrated and molded into a unit. Copper terminals are respectively connected to the stator coil 21 by copper lead wires 22 and to the rectifiers 10. The mold material of terminal unit 14 is thermoplastic resin such as polyphenylene sulfide. The insulation bush 16 is a cylindrical spacer, which is disposed between the positive fin 15 and the negative fin 17 to space out both fins 15 and 17. The insulation bush 16 is made of thermosetting resin such as phenol resin.

The iron bush 19 has a flange, which has a lower normal electrode potential than hydrogen and a high electric resistance when oxidized. The iron bush 17 is disposed between the positive fin 15 and the insulation bush 16. A metal bolt 12 is press-fitted to the frame 4 and inserted into the pipe rivet 13. The terminal unit 14, the positive fin 15, the iron bush 19 (sacrificing metal member), the insulation bush 16, the negative fin 17 are pierced by the iron pipe rivet 13 to be riveted in this order. Thereafter, the bolt 12 is inserted into a fixing hole of the cover 11 so that the rectifier unit 10 and the cover 11 are axially fastened to the rear frame 4 by an iron nut 18. Thus, the positive fin 15, the iron bush 19 are spaced apart from, but fixed to, the negative fin 17, the rear frame 4, the bolt 12 and the cover 11.

The iron bush 19, which has lower normal electrode potential than hydrogen, is interposed between the positive fin 15 and the insulation bush 16. Therefore, the copper-made positive fin 15 can be prevented from being soluble into conductive liquid such as salt water. Thus, the rectifier 10 provides a protecting arrangement.

Because of the iron bush 19, the iron nut 18 is prevented from being unfastened due to creep of resinous cover member used in a conventional rectifier unit. Since the iron bush has a comparatively high electric resistance, the surface-discharging passage is prevented from forming on the surface of the bush 16 even if it is covered with conductive liquid.

Figure 3A:
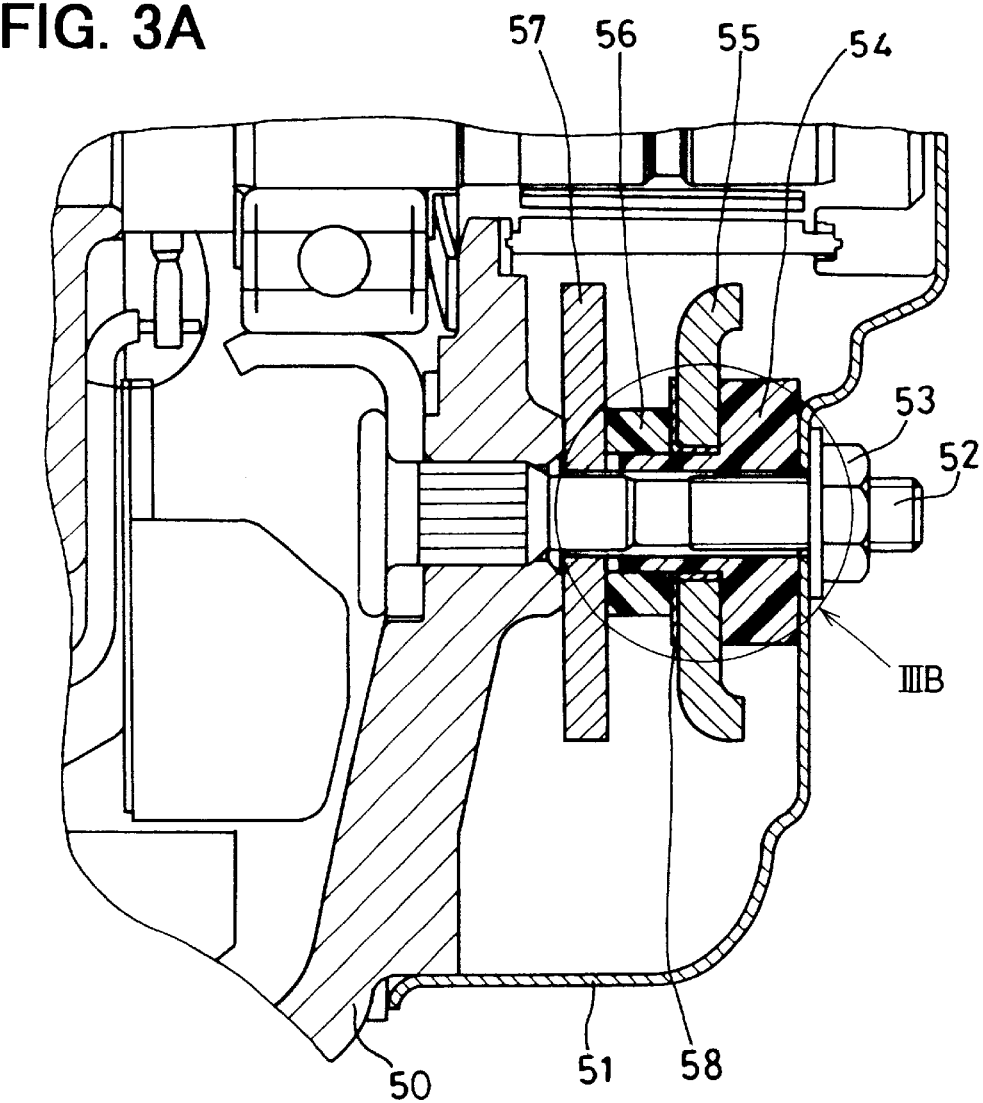
FIG. 3A is an enlarged cross-sectional view of a rectifier protection arrangement of a rectifier unit of a vehicle AC generator according to a second embodiment of the invention.
Figure 3B:
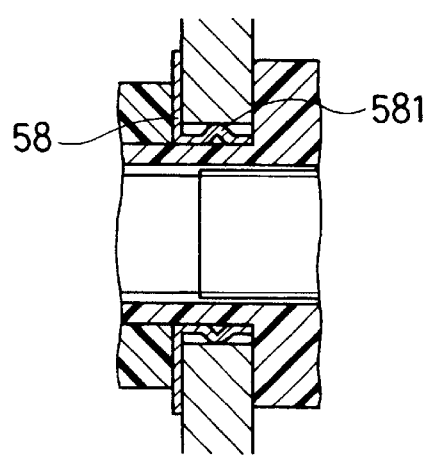
FIG. 3B is an enlarged cross-sectional view illustrating a main portion of a metal bush.

A rectifier protection arrangement according to a second embodiment of the invention is described with reference to FIGS. 3A and 3B. In the meantime, the same reference numeral as used above represents the same or substantially the same part or portion as the above-described embodiment.

A copper-made positive fin 55 is disposed on the side of a cover 51 and a negative fin 57 is disposed on the side of a frame 50, which maintains the same effect as the first embodiment. Reference numeral 56 is an insulation bush, and reference numeral 58 is a iron bush. The iron bush 58 has a cylindrical portion and a flange that is disposed between the bush 58 and the positive fin 55. The bush 58 has four projections 581 on the outer periphery of the cylindrical portion. The mold material of the terminal unit 54 may be thermoplastic resin or similar material. A bolt 52 is inserted into a fixing hole of the cover 51 so that the cover is fastened to the frame 50 by a nut 53.

Figure 4:
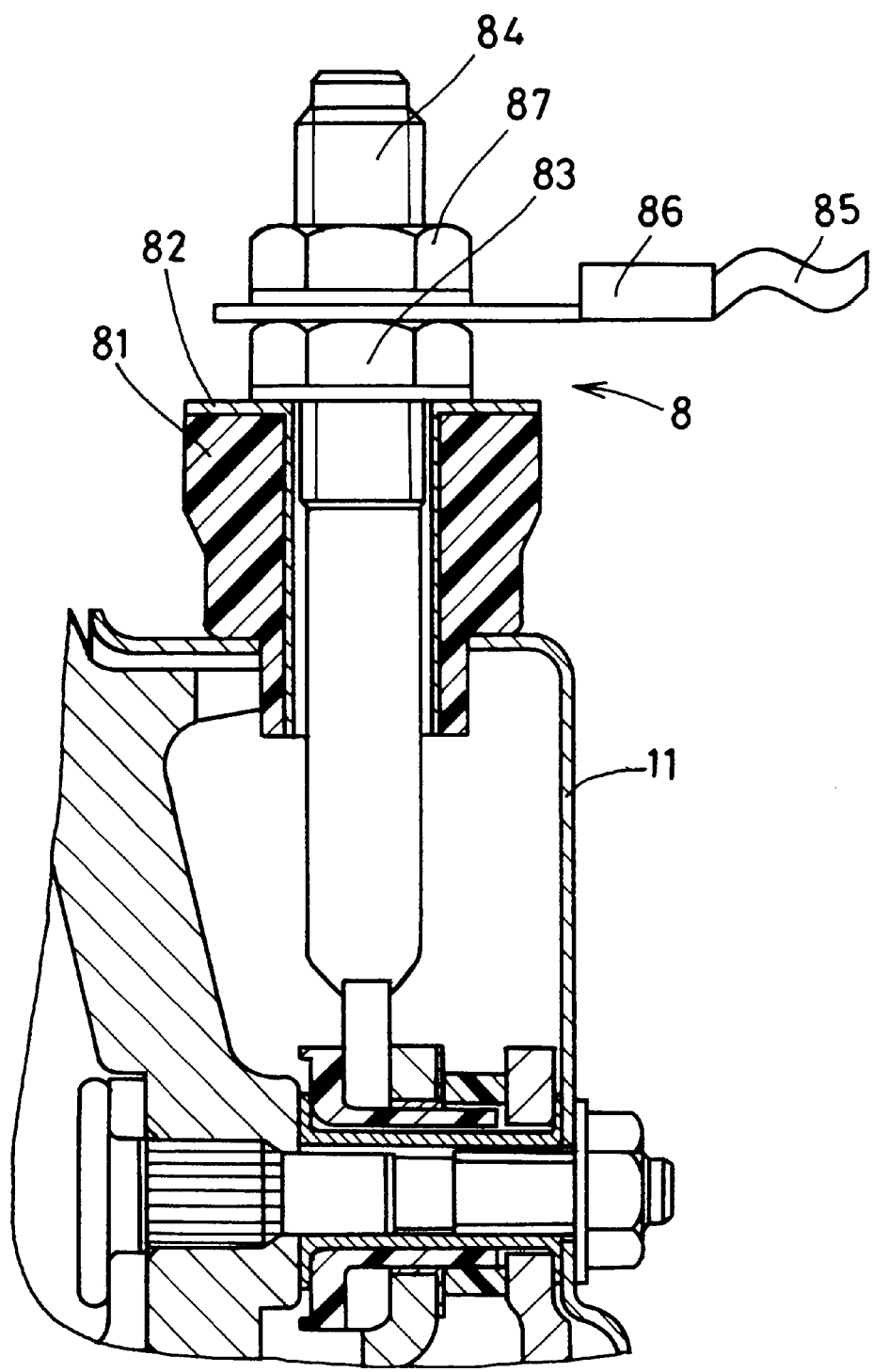
FIG. 4 is an enlarged cross-sectional view of a rectifier protection arrangement of an output terminal of a vehicle AC generator according to a third embodiment.
Figure 5:
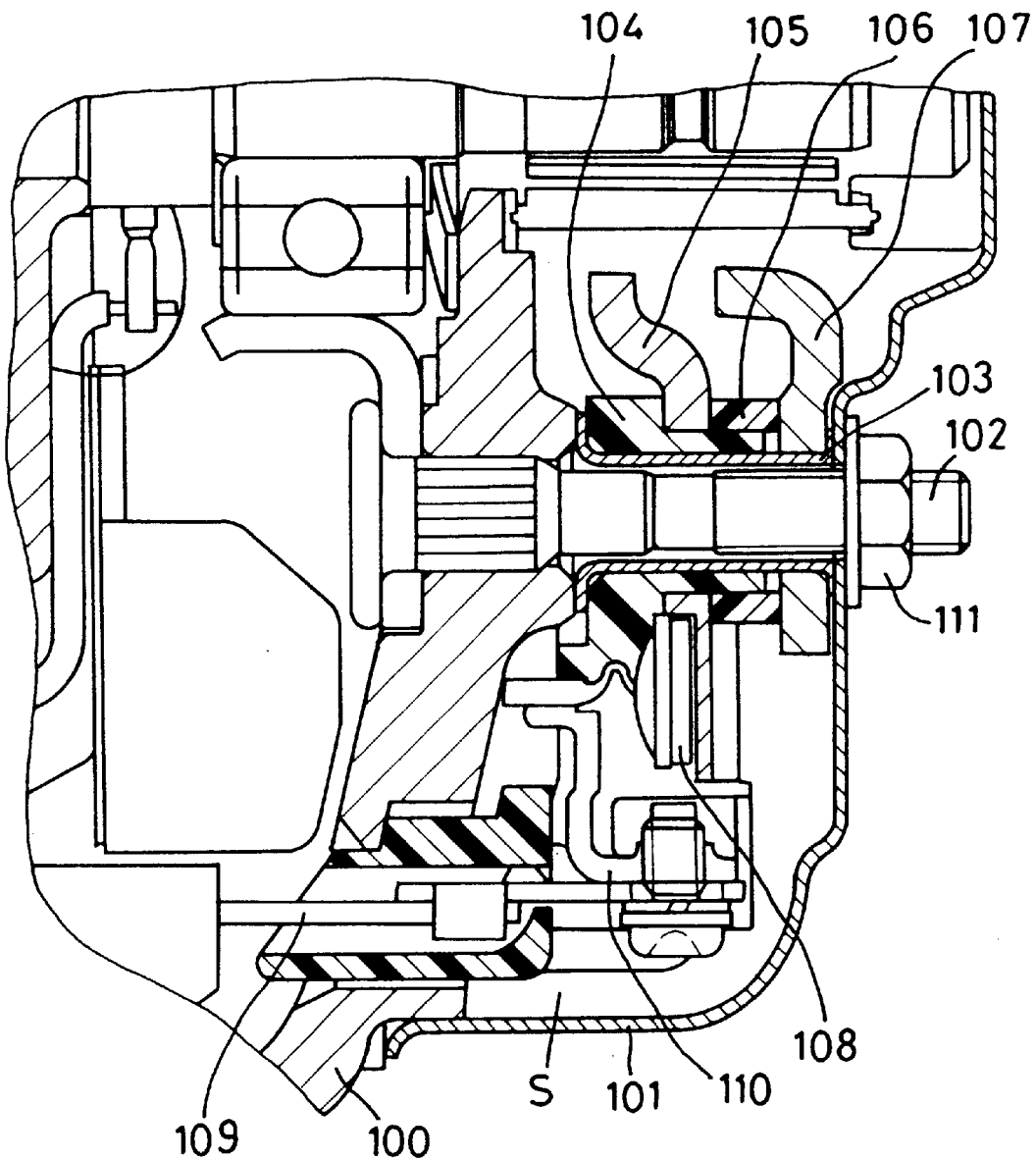
FIG. 5 is a cross-sectional view illustrating an example of a fixing arrangement around a rectifier unit and a cover of a conventional vehicle AC generator.

A rectifier protection arrangement of an output terminal device of a vehicle rotary electric machine according to a third embodiment of the invention is described with reference to FIG. 4. An output terminal device 8 is comprised of a resinous insulation bush 81 fitted to a fixing hole of the cover 11, an iron bush 82 fitted to a through hole of the insulation bush 81 and a copper-made output terminal bolt 84 fitted to the through holes of the bushes 82 and 81. The output terminal bolt 84 is fastened to the cover 11 by a copper nut 83, and a copper clamp member 86 that clamps a cable 85 at an end is fastened to the output terminal bolt 84 by a nut 87.

Since the iron bush 82 is made of the same material as the iron bush 19, it achieves the same effect as the iron bush 19 as described above.

(Variation)

In the above embodiments, a sacrificing metal (i.e. iron) bush, which has a higher ionization tendency than the positive conductor member (i.e. a copper-made cooling fin), is disposed between the surface of the insulation member and the positive conductor member to maintain continuous insulation. In addition, it is possible to plate the positive fin 15 and the output terminal bolt 84 with such sacrificing metal.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle rotary electric machine having a rectifier protection arrangement, said protection arrangement including a positive conductor member that has a higher normal electrode potential than hydrogen, a ground potential conductor member and an insulation member, disposed between said positive conductor member and said ground potential conductor member, for insulating said positive conductor member, wherein a sacrificing metal member that has a lower normal electrode potential than said positive potential conductor member is disposed in a space between said positive conductor member and said insulation member to cover a surface of said positive potential conductor member disposed in said space from said insulation member and form an oxidized layer of said sacrificing metal member when conductive liquid exists in said space, and said sacrificing metal member has a higher electric resistance than said positive potential conductor member if oxidized.

2. The rotary electric machine as claimed in claim 1, wherein said sacrificing metal member are soluble as metal ions in conductive liquid even after an oxidized layer of said sacrificing metal member is formed on the surface thereof if the surface of said oxidized layer is covered with conductive liquid.

3. The rotary electric machine as claimed in claim 1, wherein in said sacrificing metal member covers portions other than electric connection surface of said positive conductor member.

4. The rotary electric machine as claimed in claim 1, wherein said positive conductor member comprises a positive cooling fin including positive rectifier elements mounted thereon, said ground potential conductor member comprises a negative cooling fin including negative rectifiers mounted thereon, said insulation member comprises a spacer having a hole that maintains a space between said two fins, and said sacrificing metal member comprises a flanged member disposed between said spacer and said positive cooling fin, thereby forming a rectifier of said vehicle AC generator to be fastened to a frame of said vehicle AC generator by a fastening member piercing said spacer.

5. The rotary electric machine as claimed in claim 1, wherein said positive conductor member comprises an output terminal bolt protruding from a cover of said rectifier unit fixed thereto, said ground potential conductor member comprises one of a cover and a frame of said vehicle AC generator to which said cover is fixed, said insulation member comprises a resinous spacer having a hole through which said output terminal bolt extends, said spacer is fixed to said cover, said sacrificing metal member has a flange disposed between said spacer and said output terminal bolt, and said sacrificing metal member and said insulation member are fastened to each other when a cable is fastened to said output terminal bolt.

6. The rotary electric machine as claimed in claim 1, wherein said sacrificing metal member has a projection at a portion in contact with said positive conductor member.

* * * * *